US006578737B2

(12) United States Patent
Jackman

(10) Patent No.: US 6,578,737 B2
(45) Date of Patent: Jun. 17, 2003

(54) PRESSURE ACTIVATED SELF-OPENING CARTRIDGE NOZZLE

(76) Inventor: Paul D. Jackman, 271 Edmands Rd., Framingham, MA (US) 01701

( * ) Notice: Subject to any disclaimer, the term of this patent is extended or adjusted under 35 U.S.C. 154(b) by 0 days.

(21) Appl. No.: 09/910,063

(22) Filed: Jul. 23, 2001

(65) Prior Publication Data

US 2003/0015548 A1 Jan. 23, 2003

(51) Int. Cl.[7] ............................ G01F 11/00; B67D 5/00

(52) U.S. Cl. ............................... 222/1; 222/82; 222/83; 222/326

(58) Field of Search ........................... 222/82, 83, 83.5, 222/326, 327, 386, 566, 1

(56) References Cited

U.S. PATENT DOCUMENTS 5,161,715 A * 11/1992 Giannuzzi .................. 222/105
5,505,336 A * 4/1996 Montgomery et al. ...... 222/326
5,897,028 A * 4/1999 Sauer ......................... 222/105
6,029,856 A * 2/2000 Jackman ...................... 222/82

* cited by examiner

*Primary Examiner*—Joseph A. Kaufman
(74) *Attorney, Agent, or Firm*—William Nitkin

(57) ABSTRACT

An improved cartridge for holding a variety of filler materials for use with a gun system, such cartridge of the type having a nozzle wherein the foil seal above the filler material in the barrel and beneath the nozzle can be punctured by pressurizing the filler material which action causes foil seal to move into contact with a sharpened edge disposed under the innerside of the base of the top under the sidewall of the nozzle to puncture the foil seal.

2 Claims, 5 Drawing Sheets

PRESSURE ACTIVATED SELF-OPENING CARTRIDGE NOZZLE

FIELD OF INVENTION

The device of this invention resides in the area of cartridges having nozzles and foil seals located at the bottom of such nozzles, such cartridges containing a variety of filler materials such as a caulking material, adhesive and the like, such cartridges, after the top of the nozzle has been opened and the foil seal broken, to be inserted into a gun for the application of its contents through the nozzle when the gun's plunger is advanced by action of its trigger, and more particularly relates to an improved nozzle having built-in means for piercing the foil seal.

DESCRIPTION OF PRIOR ART

Cartridges containing a wide variety of flowable material, such as caulking material and adhesives, are well known in the industry. Such cylindrical cartridges have nozzles at their top end and, after opening, such cartridges are inserted into guns wherein a plunger is advanced therein by action of squeezing a trigger, causing material in the cartridge to flow out through the nozzle to the area where it is to be applied. Some cartridges have a foil seal under the nozzle against which seal the material can be positioned. Some materials, if exposed to air, will harden, so that by providing such a seal, air contact with the materials before the cartridge is opened is minimized. To open a cartridge having a foil seal, one must first snip off the tip of the plastic nozzle and then insert an object down the nozzle to puncture the foil seal located at the bottom of the nozzle to allow the passage of the filler material out of the cartridge. It is sometimes difficult to locate a narrow enough instrument to insert down the open nozzle tip to puncture the foil seal. Further, if one snips off the nozzle tip to leave a small diameter opening to achieve a fine application bead of material and one does not have an instrument narrow enough to pass down through the opening in the nozzle to puncture the foil seal, one can undesirably stretch the nozzle tip by using a larger object, making it difficult to apply a narrow bead of material as the now-wider opening in the nozzle tip will allow a wider-than-desired bead of material to pass out the nozzle.

Cartridges filled with a variety of filler materials are commonly sold. The tops of such cartridges including their nozzles are formed of plastic. The top is spun within the barrel to effect a heat seal with the sides of the barrel. Nozzle tops are also made in two parts wherein plastic nozzle top is press fit into a metal crimpable end cap, forming a nozzle top which can be crimped onto a paperboard barrel. The foil seal of a cartridge is located beneath the central bore of the nozzle which foil seal prevents the premature escape of the filler material when the cartridge is loaded in the gun and also prevents such material from drying out and hardening within the cartridge. The tip of the cartridge nozzle is often initially sealed and must be snipped off at a desired point along the tapered nozzle to effect the desired shape of opening to create the size of the bead of material which will be applied by the user.

My own patent, granted to Paul D. Jackman, U.S. Pat. No. 6,029,856, issued on Feb. 29, 2000, hereafter referred to as "my prior patent" describes a self-puncturing cartridge nozzle. The devise of my prior patent requires that the user manually bend the nozzle laterally in relation to nozzle base which motion causes a sharpened edge located at the inside of the base of the nozzle to cut through the foil seal.

Normally cartridge nozzles are opened by first snipping the tip off at a certain distance from the tapered end to achieve a specific bead width. A disadvantage of my prior patent is that the user is also required to bend the nozzle to a specific point whereby the foil seal is punctured. This manual opening procedure related to the foil seal must be communicated to the user in writing on the cartridge body of specific instructions regarding it. The above describes a two step opening procedure.

Disadvantages of my prior patent:

(a) Two separate steps are required to open the cartridge.

(b) A user may inadvertently bend the nozzle too far and possibly fracture plastic at base of nozzle.

(c) A user may not bend the nozzle far enough to sufficiently puncture the foil seal.

(d) A cartridge may be dropped accidentally causing nozzle to bend and puncture foil seal before it was intended to be opened possibly causing contents to leak or dry out.

(e) Softer, pliable plastic compounds required to allow nozzle to be flexible may be too weak for requirements in shipping, handling, vertical stacking, and other manufacturing procedure.

(f) Foil seals could be punctured by persons tampering with cartridges at retail locations which could cause filler material to dry out.

SUMMARY OF INVENTION

It is the object of this invention to provide a cartridge for containing various filler materials having a nozzle tip and a foil seal thereunder with self contained means to puncture foil seal by pressurizing filler material to allow the passage through the nozzle of the contents of the cartridge.

To accomplish this result, the plastic nozzle top of the cartridge is formed with a downwardly extending sharp edge disposed above the foil seal. When the contents of the cartridge is pressurized, the foil seal is forced by such pressure into the sharp edge at the base of the nozzle causing the foil seal to puncture and thereby allow the contents of the cartridge to pass through the opened tip of the nozzle for application.

It is yet a further object of this invention to provide an improved nozzle to a cartridge barrel which is molded of plastic which can be easily substituted for prior art nozzle tops during the manufacture of cartridges without any other changes to the product required and which can be entirely molded of one piece of plastic.

It is yet a further object of this invention to provide an improved nozzle top to a cartridge which can be press fit into a crimpable metal end cap.

BRIEF DESCRIPTIONS OF THE DRAWINGS

DESCRIPTION OF THE PREFERRED EMBODIMENT

Figure 1:
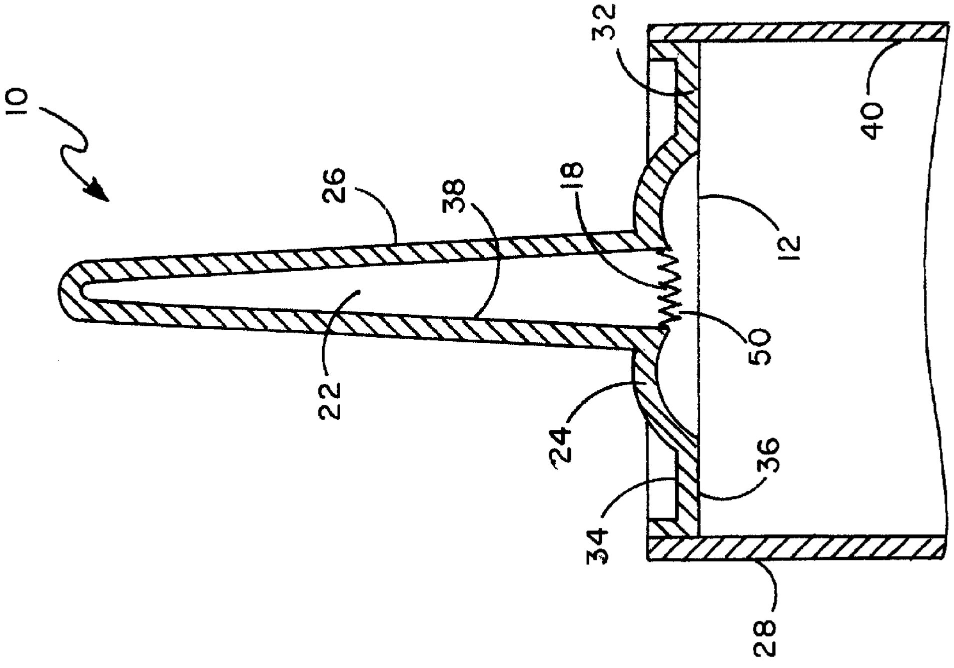
FIG. 1 illustrates a cross sectional view through the top end of a cartridge embodying the self puncturing cartridge nozzle structure of this invention. Cartridge is depicted empty.
Figure 4:
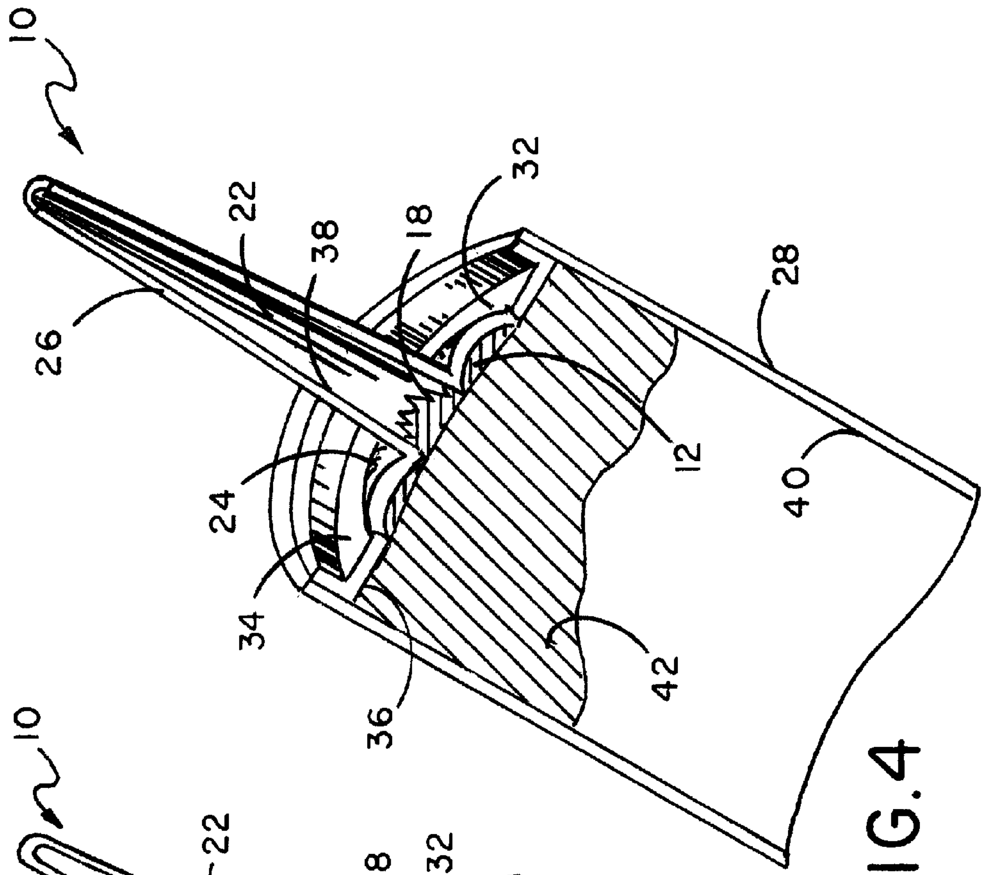
FIG. 4 illustrates a perspective cutaway view of the cartridge of FIG. 3 showing the filler material moderately pressurized by trigger movements of gun causing foil seal to move into close proximity to cutting teeth.
Figure 3:
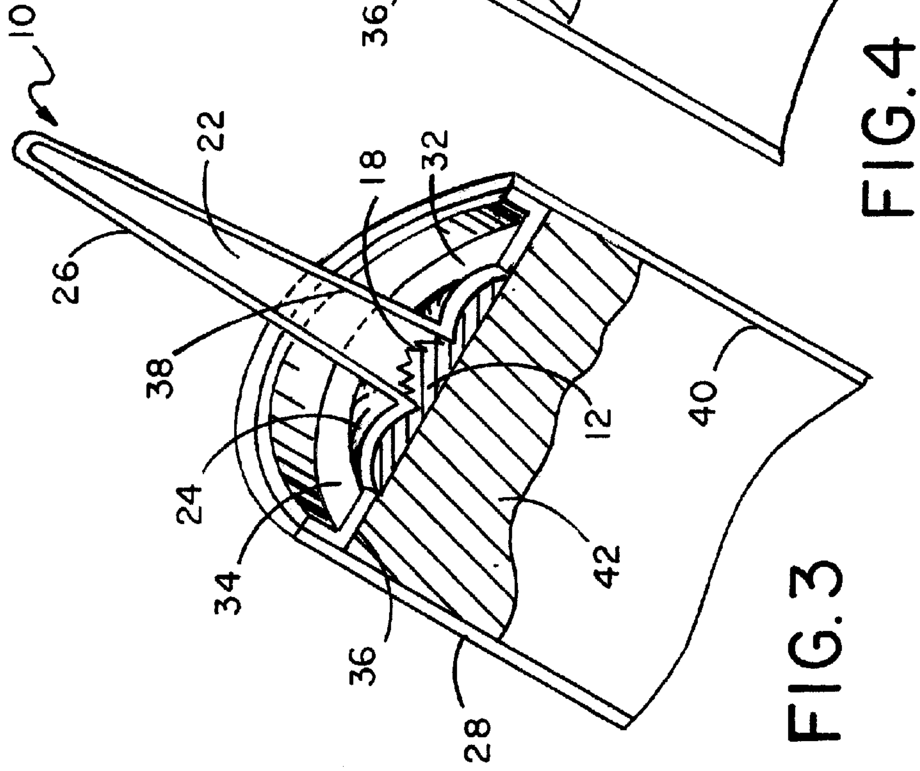
FIG. 3 illustrates a perspective cutaway view of the top end of a cartridge showing the construction of the structure of this invention.

In FIG. 1, the self puncturing cartridge nozzle structure of this invention is seen with nozzle 26 disposed above barrel 28 of a cartridge partially shown in a cross sectional side view. Top 10 is also seen attached to barrel 28. A puncturable foil seal 12 is located under top 10. Foil seal 12 does not necessarily have to be made of foil and could be made of other material so that when the term "foil seal" is used herein, it should be understood to include seals made of other materials. For purposes of illustration, no filler material is shown disposed in barrel 28 of the cartridge in FIGS. 1, 6, and 7. Base 32 of top 10 of this invention, though, differs from the flat bases of the prior art in that a circular flange 24 is formed in the base 32 of the top 10 with the centermost section of circular flange 24 extending under the bottom perimeter of the sidewall 38 of nozzle 26 around central bore 22 forming a sharpened circular edge at inside base of nozzle 50.

Figure 5:
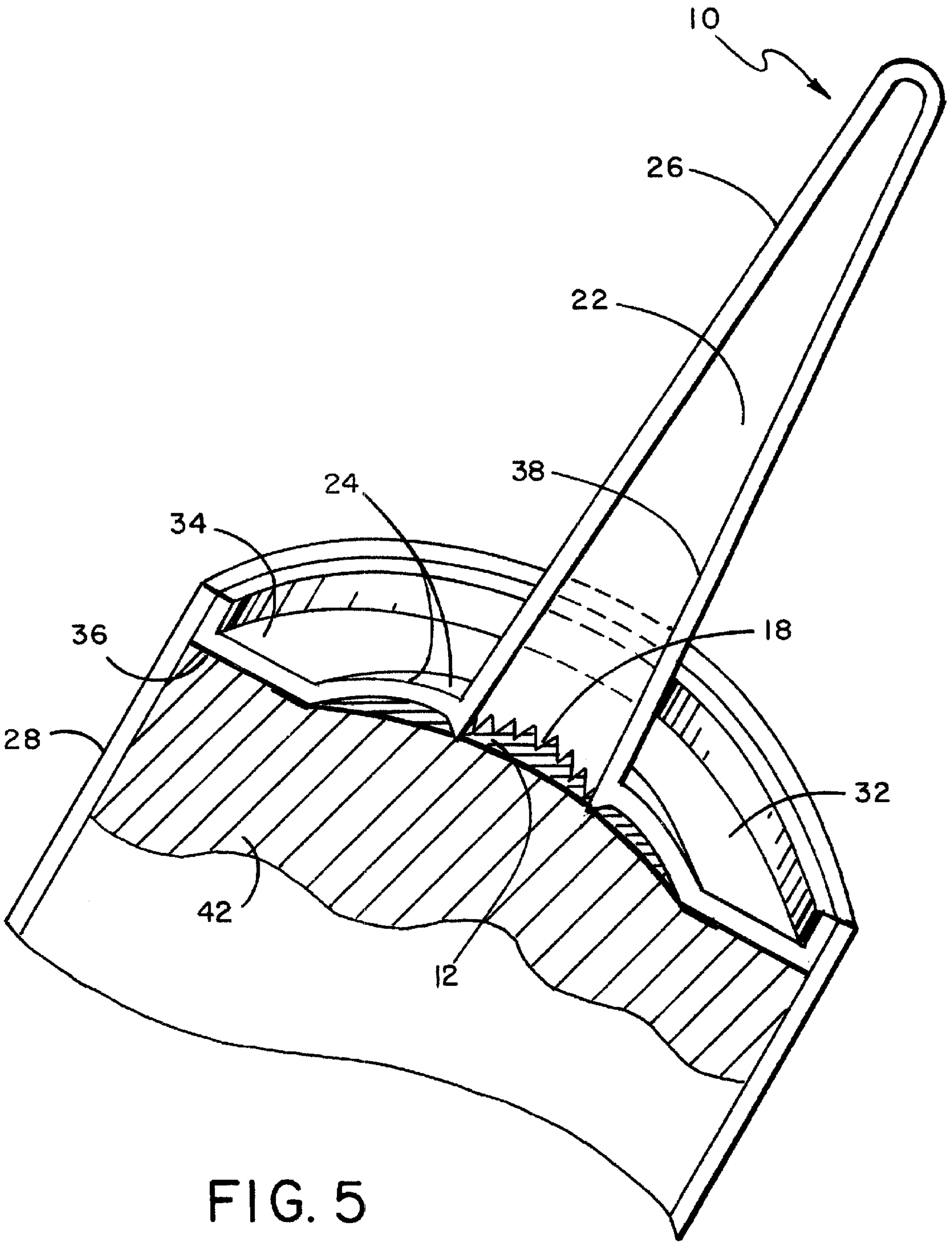
FIG. 5 illustrates a perspective cut away view of the cartridge of FIG. 4 showing close up detail of foil seal in close proximity to serrated edge.
Figure 6:
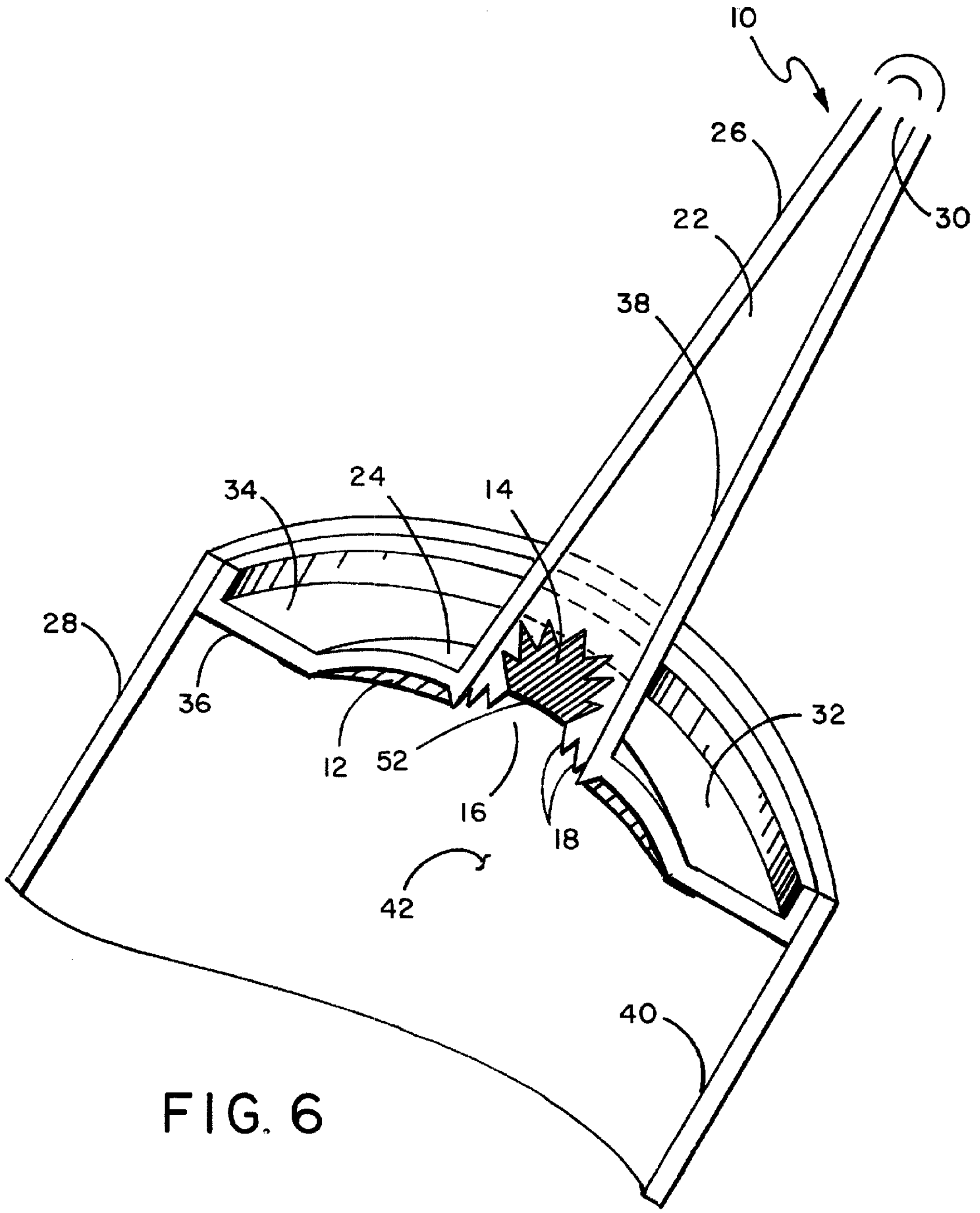
FIG. 6 illustrates a perspective cutaway view of the cartridge of FIG. 5 showing foil seal cut through by further pressurization of filler material in a semi-circular cut out.
Figure 7:
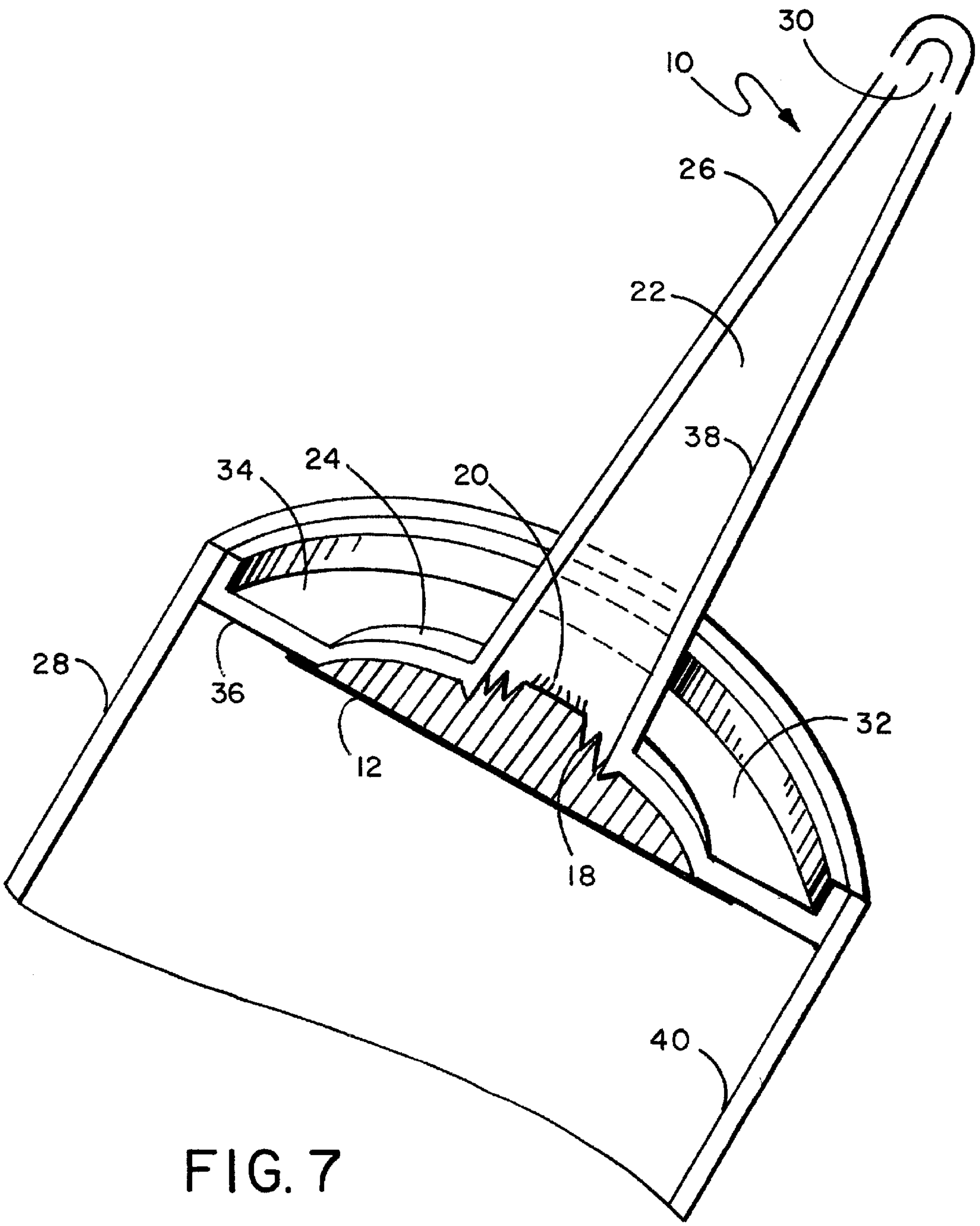
FIG. 7 illustrates a perspective cutaway view of the cartridge of FIG. 6 showing close up detail of serrations and rounded pivot where serrations are omitted.

Such sharpened circular edge can be formed into a plurality of serrations 18 such as seen in FIG. 1. In practice, to puncture foil seal 12 one places cartridge in a manual or power actuated gun which are known in the industry. Opening 30 is cut in tip of nozzle 26 and pressurization of filler material 42 causes foil seal 12 to be stretched convexly towards serrations 18 inside of base of nozzle 24 seen in FIG. 5. It should be noted that opening 30 could also be cut at tip of nozzle 24 after foil seal 12 is punctured 16. In FIG. 6, filler material 42 under increased and sufficient pressure forces foil seal 12 into contact with serrations 18 causing cut portion 14 in foil seal 12 thereby allowing filler material 42 to pass through nozzle 26 for application. The cut portion 14 of foil seal 12 is prevented from passing through nozzle 26 by a section of cut portion 14 remaining attached to foil seal 12. Rounded pivot 20 where serrated teeth 18 are omitted prevents cut portion 14 from completely detaching from foil seal 12 thus preventing cut portion 14 from lodging in narrowing taper of nozzle 26 and from passing through opening 30 and into discharged filler material 42.

The invention herein can be easily and economically adopted because the top 10 can be molded of one piece of plastic as is currently done but the mold shape will include the formation of a circular flange 24 to allow serrated teeth 18 to be disposed above foil seal 12 so that foil seal 12 can be forced by the pressurization of filler material 42 thereby causing foil seal 12 to be forced through serrated teeth 18 thereby allowing filler material 42 to flow through opening 30 in nozzle 26. Seal 12 as shown only extends under the nozzle 26 and the circular flange 24 but it should be noted that in some embodiments it could extend all the way out to side 40 of barrel 28.

Figure 2:
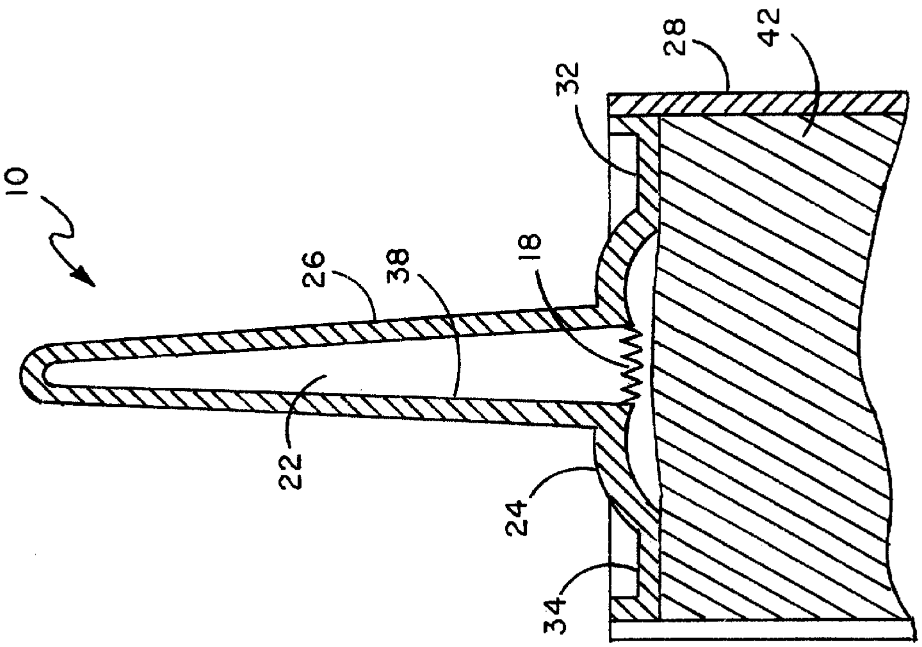
FIG. 2 illustrates a cross-sectional view through the end of the cartridge tip of FIG. 1, showing filled cartridge illustrating slightly domed foil seal resulting from initial pressurizing of filler material.

It is felt that the pressure activated self-opening cartridge nozzle structure of this invention is a significant improvement over prior art cartridge nozzles as the user would no longer have to locate an object to insert down through opening 30 in the nozzle 26 as seen in FIGS. 1 and 2 to puncture the foil seal 12 and the user can quickly and easily puncture the foil seal 12 by simply placing cartridge in gun, cut opening 30 in tip of nozzle 26 applying trigger pressure and filler material 42 will flow as if no foil seal 12 existed at all.

After placing cartridge in the gun, the moving of the trigger causes advancing of the plunger therein, thereby pressurizing filler material. Further pressurizing results in increasing pressure on foil seal, thereby stretching and moving foil seal towards the serrated edge. Stretching of foil seal increases by the pressurizing of filler material caused by continuing trigger movements. The foil seal is forced into and through the serrated edge, thereby cutting C-shaped opening in foil seal. The flowing of filler material through the nozzle forces the cut portion of foil seal into close proximity of inner sidewall of nozzle. The filler material, now unobstructed by foil seal, can pass through the nozzle.

Although the present invention has been described with reference to a particular embodiment, it will become apparent to those skilled in the art that variations and modifications can be substituted therefor without departing from the principles and spirit of the invention.

I claim:

1. A method of opening a cartridge nozzle of the type having a side wall, a bore and a base used on a cartridge containing flowable filler material, such cartridge utilized within a cartridge gun of the type having a plunger moved by trigger action that upon trigger activation pressurizes said filler material, comprising the steps of:

providing a nozzle having a sharp edge fixed in position at the base of the side wall of said nozzle;

providing a stretchable seal member disposed under the base of said nozzle extending under said sharp edge of the base of said side wall of said nozzle, said seal member spaced a distance away from said puncture means;

pressurizing said filler material by advancing the plunger of said cartridge gun;

convexly stretching and moving said seal member by the pressure on said filler material to contact said sharp lower edge of said base wall of said nozzle; and puncturing said seal member by the action of said seal member being moved and forced against said sharp lower base wall of said nozzle to allow said filler material to pass through said punctured seal member into said nozzle.

2. The method of claim 1 further including the steps of:

providing said sharp edge only partially around the base wall of said nozzle, leaving a rounded pivot point with said sharp edge to cut only partially through said seal member to allow said uncut portion of said seal member to remain attached to the balance of said seal member by said uncut portion.

* * * * *